(12) United States Patent
Tamakoshi (10) Patent No.: US 7,992,926 B2
(45) Date of Patent: Aug. 9, 2011

(54) VEHICLE END PORTION STRUCTURE

(75) Inventor: Koji Tamakoshi, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 133 days.

(21) Appl. No.: 12/524,492

(22) PCT Filed: Jan. 21, 2008

(86) PCT No.: PCT/IB2008/000906
§ 371 (c)(1),
(2), (4) Date: Jul. 24, 2009

(87) PCT Pub. No.: WO2008/093244
PCT Pub. Date: Aug. 7, 2008

(65) Prior Publication Data
US 2009/0315311 A1    Dec. 24, 2009

(30) Foreign Application Priority Data
Feb. 1, 2007    (JP) ................................. 2007-023288

(51) Int. Cl.
*B60J 7/00* (2006.01)
(52) U.S. Cl. ................................................. 296/187.09
(58) Field of Classification Search ............. 296/187.09, 296/203.02, 187.11; 280/784; 180/274; 293/133
See application file for complete search history.

(56) References Cited

U.S. PATENT DOCUMENTS

| | | | | |
|---|---|---|---|---|
| 2,825,380 A * | 3/1958 | Reiner | ......................... | 411/113 |
| 3,981,530 A * | 9/1976 | Yamanaka et al. | .......... | 296/35.2 |
| 5,040,646 A * | 8/1991 | Drefahl | ........................ | 188/371 |
| 5,605,353 A * | 2/1997 | Moss et al. | ..................... | 280/784 |
| 6,029,765 A * | 2/2000 | Chou et al. | ..................... | 180/292 |
| 6,152,521 A * | 11/2000 | Hayashi et al. | .......... | 296/187.09 |
| 6,174,009 B1 * | 1/2001 | McKeon | ........................ | 293/133 |
| 6,435,299 B1 * | 8/2002 | Miller | ............................ | 180/381 |
| 6,659,518 B2 * | 12/2003 | Ponsonnaille et al. | ........ | 293/102 |
| 6,808,039 B2 * | 10/2004 | Roehringer et al. | .......... | 180/312 |
| 6,820,924 B2 * | 11/2004 | Caliskan et al. | ......... | 296/187.03 |
| 6,854,941 B2 * | 2/2005 | Csik | ............................. | 411/112 |
| 6,893,063 B2 * | 5/2005 | Harrison et al. | ............. | 293/117 |
| 7,237,829 B2 * | 7/2007 | Latimer et al. | ........... | 296/187.11 |
| 7,357,432 B2 * | 4/2008 | Roll et al. | ...................... | 293/133 |
| 7,543,537 B2 * | 6/2009 | Seitzberger et al. | ........ | 105/392.5 |
| 7,581,778 B2 * | 9/2009 | Maya et al. | .................... | 296/132 |
| 7,896,412 B2 * | 3/2011 | Wang et al. | ................... | 293/133 |
| 7,896,428 B2 * | 3/2011 | Tamakoshi et al. | ...... | 296/187.03 |
| 7,900,964 B2 * | 3/2011 | Chretien et al. | ............. | 280/784 |
| 2005/0240185 A1 * | 10/2005 | Boomer et al. | ................ | 606/69 |
| 2009/0140546 A1 * | 6/2009 | Okabe et al. | ............. | 296/187.09 |
| 2010/0026051 A1 * | 2/2010 | Tamakoshi | ............... | 296/203.02 |

FOREIGN PATENT DOCUMENTS

| | | |
|---|---|---|
| DE | 10-2004-018052 A1 | 11/2005 |
| JP | 2002-160663 A | 6/2002 |
| JP | 2005-082020 A | 3/2005 |

\* cited by examiner

*Primary Examiner* — Kiran B. Patel
(74) *Attorney, Agent, or Firm* — Kenyon & Kenyon LLP

(57) ABSTRACT

A front end portion of a side member functions as a crumple zone during a collision with another vehicle or the like. A radiator support is attached via a bracket to this crumple zone. When another vehicle or the like collides with the side member, the radiator support separates from the side member. When another vehicle or the like collides with the radiator support, external force applied in the rear direction to the radiator support is transmitted to the side member.

5 Claims, 12 Drawing Sheets

VEHICLE END PORTION STRUCTURE

This is a 371 national phase application of PCT/IB2008/000906 filed 21 Jan. 2008, claiming priority to Japanese Patent Application No. 2007-023288 filed 1 Feb. 2007, the contents of which are incorporated herein by reference.

FIELD OF THE INVENTION

The invention relates to an end portion (either a front end portion or a rear end portion or both) structure of a vehicle.

BACKGROUND OF THE INVENTION

A vehicle structure is known in which a side member that extends in the longitudinal direction of a vehicle is provided on each side portion of the vehicle. The end portion of each side member has a crumple zone (i.e., a crushable zone) provided to absorb impact during a collision or the like. Also, a radiator is provided at the front of the vehicle. This radiator is supported by a radiator support, for example, which is provided so as to connect the crumple zones of both side members. If another vehicle or the like collides with a sub-frame that extends in the lateral (i.e., left-right) direction of the vehicle, such as this kind of radiator support or the like, the force of impact on the sub-frame will be transmitted to the side members where it will be absorbed at the crumple zones of those side members.

An example of this kind of vehicle structure is described in Japanese Patent Application Publication No. 2005-82020 (JP-A-2005-82020). In this vehicle structure, the entire sub-frame is fixed to the front end portion of the side members. If another vehicle or the like collides with the sub-frame, the force of impact from the collision will be transmitted to the crumple zones of the side members that are fixed to the sub-frame, where it will be absorbed.

However, with the vehicle structure described in JP-A-2005-82020, the sub-frame and the side members are entirely fixed to each other. Therefore, the strength of the portion of the crumple zones of the side members that is fixed to the sub-frame is greater than it is at other portions which may inhibit its ability to deform in the event that another vehicle or the like collides with the vehicle from the front of a side member. As a result, the crumple zone becomes that much narrower which reduces the ability to absorb the impact.

One conceivable way to solve this problem is to not fix the sub-frame to the side members. However, if the sub-frame was not fixed to the side members and another vehicle was to collide with the sub-frame and there was a large difference in height between the two vehicles, for example, the force of impact on the sub-frame would not be able to be transmitted to the side members, which would reduce the ability of the sub-frame to absorb the impact.

DISCLOSURE OF THE INVENTION

This invention thus provides an end portion structure with improved impact absorbability realized by having impact force be efficiently transmitted to a crumple zone of a side member even if another vehicle or the like collides with either the side member or the sub-frame that is fixed to the side member.

A first aspect of the invention relates to a vehicle end portion structure that includes a side member which extends in a longitudinal direction of the vehicle and has a crumple zone at least one end portion from among a front end portion and a rear end portion; and a sub-frame which has a portion that protrudes vertically from the crumple zone of the side member and a portion that extends in a width direction of the vehicle. The sub-frame is attached to the side member in such a way that when external force is applied to the side member, at least a portion of the sub-frame separates from the side member by the crumple zone compressing and deforming from the external force, and when external force is applied to the sub-frame from the longitudinal direction, the external force is transmitted to the side member.

According to this structure, when another vehicle or the like collides with the side member from the longitudinal direction, the sub-frame separates from the side member so as not to inhibit the deformation of the crumple zone in the side member. Also, the sub-frame is mounted to the side member so that external force on the sub-frame from the longitudinal direction is transmitted to the side member. Accordingly, even if the other vehicle or the like collides with the side member or the sub-frame that is fixed to the side member, the force of impact can be efficiently transmitted to the crumple zone of the side member, thus improving the ability to absorb the impact.

Here, the end portion structure may also include a fastening bolt that attaches the sub-frame to the side member, and a joining portion where a fastening hole having a smaller diameter than a head portion of the fastening bolt, a release hole having a larger diameter than the head portion of the fastening bolt, and a guide hole that connects the fastening hole with the release hole are formed may be arranged in one of the sub-frame and the side member, and the fastening bolt moves along the guide hole when external force from the longitudinal direction is applied to the one of the side member and the sub-frame.

According to this kind of structure, in the event of a collision with the sub-frame, the force of impact can be transmitted to the side member, and in the event of a collision with the side member, the sub-frame is able to separate from the side member.

Also, a transmitting member which transmits external force applied to the sub-frame to the side member may be provided in a position where the sub-frame is attached to the side member.

Further, the sub-frame may be a radiator support or an under protector.

A second aspect of the invention relates to a vehicle end portion structure that includes i) a side member which extends in a longitudinal direction of the vehicle and has, at one end portion, a crumple zone that includes a first crumple zone and a second crumple zone that is provided closer to a center of the vehicle in the longitudinal direction than the first crumple zone; and ii) a sub-frame which is attached to the crumple zone so as to protrude vertically from the side member. The sub-frame includes a first fastening portion that is fastened to the side member at the first crumple zone, and a second fastening portion that is fastened to the side member at a portion other than the first crumple zone. The first fastening portion separates from the side member by the first crumple zone deforming when external force is applied to the side member. The second crumple zone deforms when external force applied to the sub-frame is transmitted to the second crumple zone via the second fastening portion.

According to the vehicle end portion structure according to the invention, impact force can be efficiently transmitted to a crumple zone of the side member even if another vehicle or the like collides with the side member or the sub-frame that is fixed to the side member, thus improving impact absorbability.

BRIEF DESCRIPTION OF THE DRAWINGS

The foregoing and further objects, features and advantages of the invention will become apparent from the following description of exemplary embodiments with reference to the accompanying drawings, wherein like numerals are used to represent like elements and wherein.

DETAILED DESCRIPTION OF THE EMBODIMENTS

Hereinafter, example embodiments of the invention will be described in detail with reference to the accompanying drawings. In the following description, like elements will be denoted by like reference numerals and redundant descriptions will be omitted. Also, the drawings have been simplified so the dimensional proportions of the drawings will not always match the objects in the description.

Figure 1:
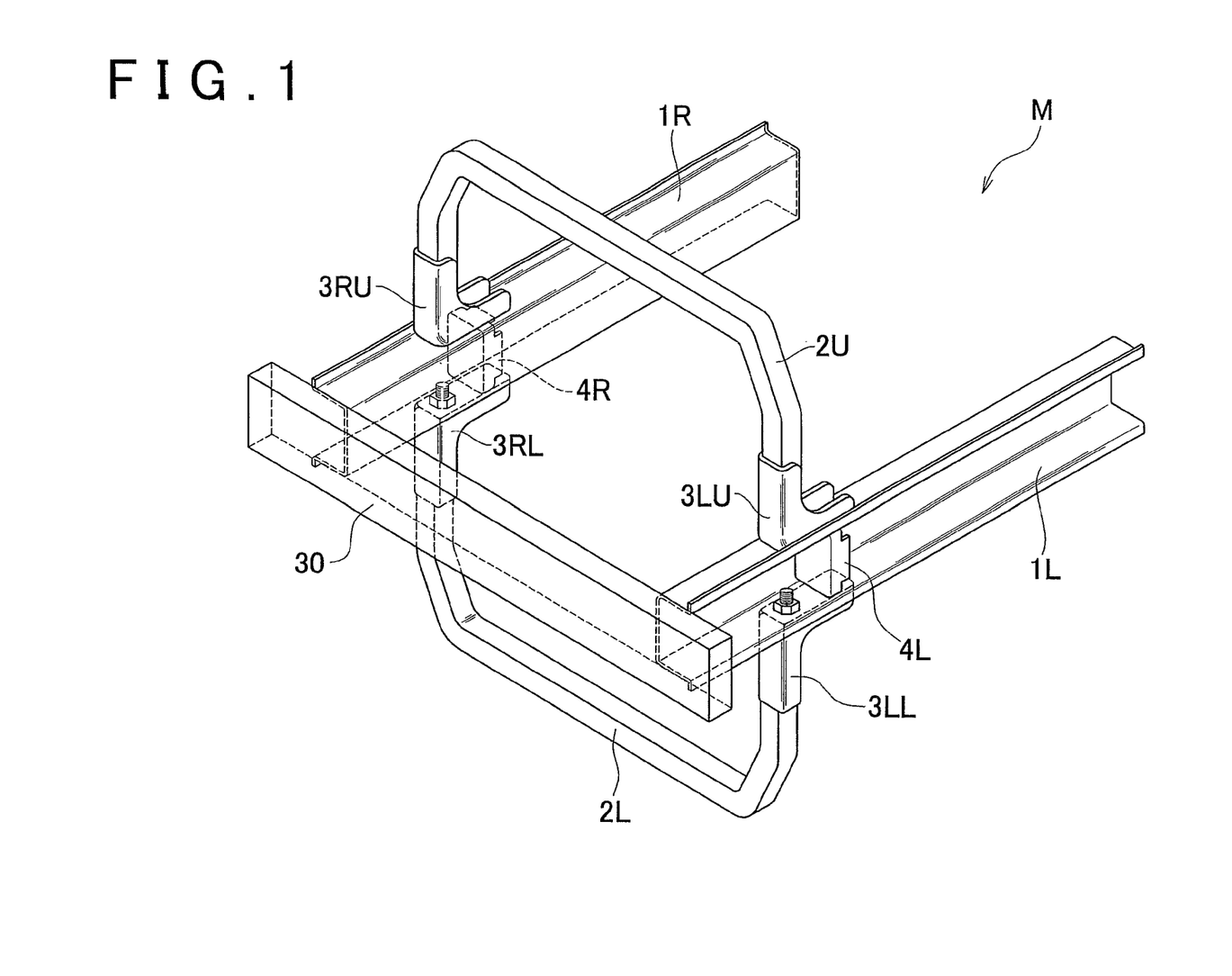
FIG. 1 is a perspective view of a front portion structure of a vehicle according to a first example embodiment of the invention.

FIG. 1 is a perspective view of a front portion structure of a vehicle according to a first example embodiment of the invention. As shown in the drawing, a vehicle M according to this example embodiment is provided with a right side member 1R that extends in the longitudinal direction on one end portion in the width direction and a left side member 1L that extends in the longitudinal direction on the other end portion in the width direction. The front end portions of these side members 1R and 1L function as crumple zones (i.e., crushable zones). An upper radiator support 2U and a lower radiator support 2L, which are side members, are attached to these crumple zones of the side members 1R and 1L. A bumper reinforcement 30 is attached to the ends of the side members 1R and 1L.

The upper radiator support 2U is formed in generally gate-shaped extending in the width direction when viewed from the front and protrudes upward from the upper sides of the side members 1R and 1L. Also, the lower radiator support 2L is formed vertically symmetrical with respect to the upper radiator support 2U. A radiator, not shown, which cools the engine in the vehicle, is provided behind the radiator supports 2U and 2L.

Figure 2A:
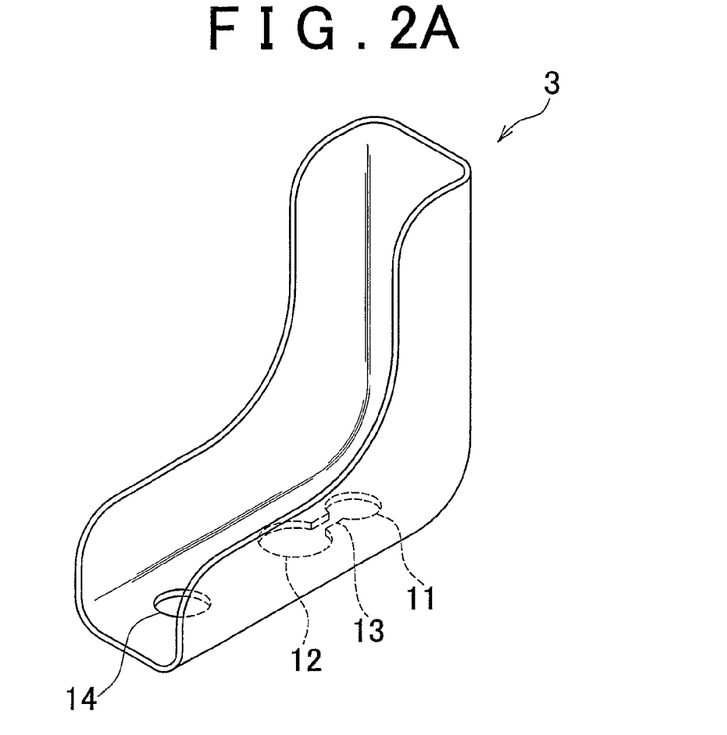
FIG. 2A is a perspective view of a bracket.

The upper radiator support 2U is mounted to the right side member 1R and the left side member 1L via a right upper bracket 3RU and a left upper bracket 3LU, respectively. Similarly, the lower left radiator support 2L is mounted to the right side member 1R and the left side member 1L via a right lower bracket 3RL and a left lower bracket 3LL, respectively. These brackets 3RU, 3LU, 3RL, and 3LL can be regarded as the joining portion of the invention. The bracket 3 shown in FIG. 2A is used as the brackets 3RU, 3LU, 3RL, and 3LL.

The bracket 3 has a horizontal plate and a rising plate. The radiator supports 2U and 2L are fixed by welding, for example, to this rising plate. Also, side plates are formed on the side portions of the horizontal plate and the rising plate. A fastening hole 11 and a release hole 12 are formed in the horizontal surface of the bracket 3.

Figure 3:
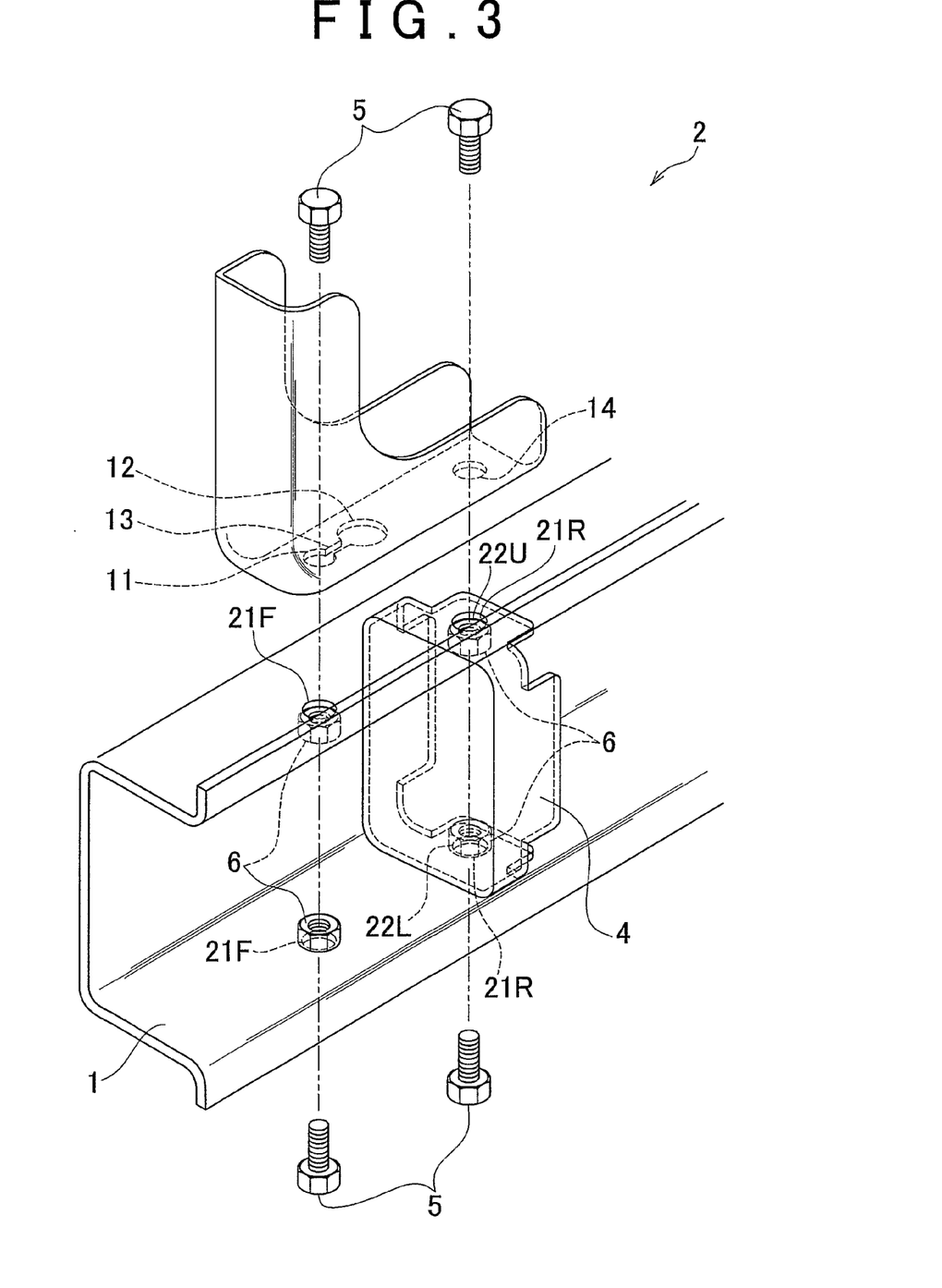
FIG. 3 is a perspective view of a side member at a portion where the bracket and the bulkhead are provided.

When mounted to the side members 1R and 1L, the bracket 3 is arranged so that the fastening hole 11 is closer to the front of the vehicle than the release hole 12 is. The fastening hole 11 and the release hole 12 are connected by a guide hole 13. A fixing/fastening hole 14 is formed to the rear of the release hole 12. As shown in FIG. 3, rear bolts 5 are fitted through the fastening hole 11 and the fixing/fastening hole 14. The radiator supports 2U and 2L are attached to the side members 1R and 1L, respectively, via the brackets 3 by fixing the bolts 5 to the side members 1R and 1L by screwing nuts 6 onto the bolts 5. Here, the fastening holes 11 and fixing/fastening holes 14 have a smaller diameter than the head portions of the bolts 5 and the release holes 12 have a larger diameter than the head portions of the bolts 5. Moreover, the width of the guide holes 13 is larger than the diameter of the threaded portions of the bolts 5 but smaller than the diameter of the head portions.

Further, a front bolt hole 21F and a rear bolt hole 21R which are arranged separated from one another in the longitudinal direction of the side member 1 are formed in each side member 1 at the position where the bracket 3 is to be fixed. The bolt holes 21F and 21R are formed in positions where the bolts that will pass through the fastening holes 11 and the fixing/fastening holes 14 in the brackets 3 when the brackets 3 are fixed to the side members 1 will be tightened.

Figure 2B:
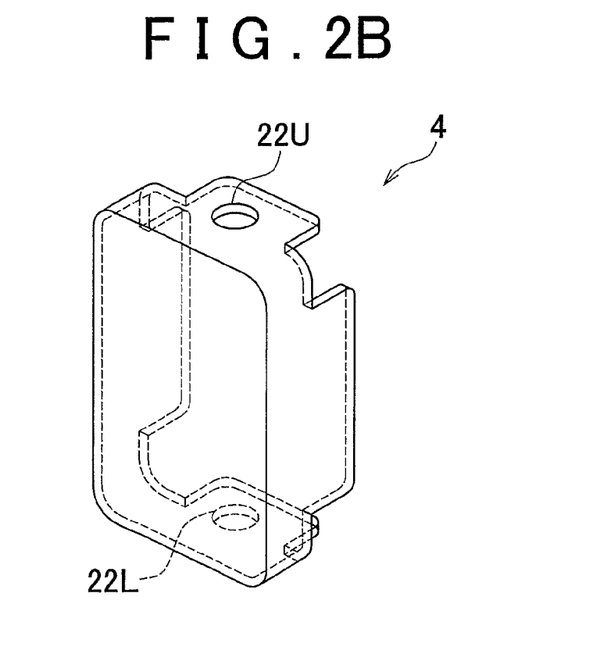
FIG. 2B is a perspective view of a bulkhead.

Also, a bulkhead 4 (4R and 4L in FIG. 1), which is a load transmitting member that is shown in FIG. 2B, is provided in a position where the bolt hole 21R through which the bolt 5 that fits through the fixing/fastening hole 14 in the bracket 3 also fits is provided in the side member 1. The shape of this bulkhead 4 when viewed from the front is generally the same as that of the inside cross-section of the side member 1. Fastening holes 22U and 22L are formed in the top and bottom of the bulkhead. The bulkhead 4 is fastened to the side member 1 by screwing the nuts 6 onto the bolts that are fitted through the fastening holes 22U and 22L, as shown in FIG. 3. Screwing the nuts 6 onto the bolts 5 in this way both fixes the bulkhead 4 to the inside of the side member 1 and fixes the bracket 3 to the side member 1. External force (load) applied to the upper radiator support 2U can be more efficiently transmitted to the side member 1 with the bulkhead 4 because the bulkhead 4 is fastened by a bolt to the lower portion of the side member 1. Also, a difference is caused in strength between a fasten portion of the side member 1, to which the bulkhead 4 is fastened, and a release portion of the side member 1, to which the bulkhead 4 is not fastened. Therefore, deformation of the release portion is promoted. As a result, the front bolt 5 slips out of the release hole 12 more easily, when a vehicle collision occurs.

With the vehicle front portion structure according to this example embodiment having the foregoing structure, when the vehicle M is involved in a frontal collision, the force of impact from the collision can be softened by absorbing it by having the crumple zones of the side members 1R and 1L deform by buckling. In this case, when the vehicle M is involved in a frontal collision with another vehicle or the like, the other vehicle collides with the bumper reinforcement 30 or the radiator supports 2U and 2L via the body of the vehicle M, for example.

Figure 4A:
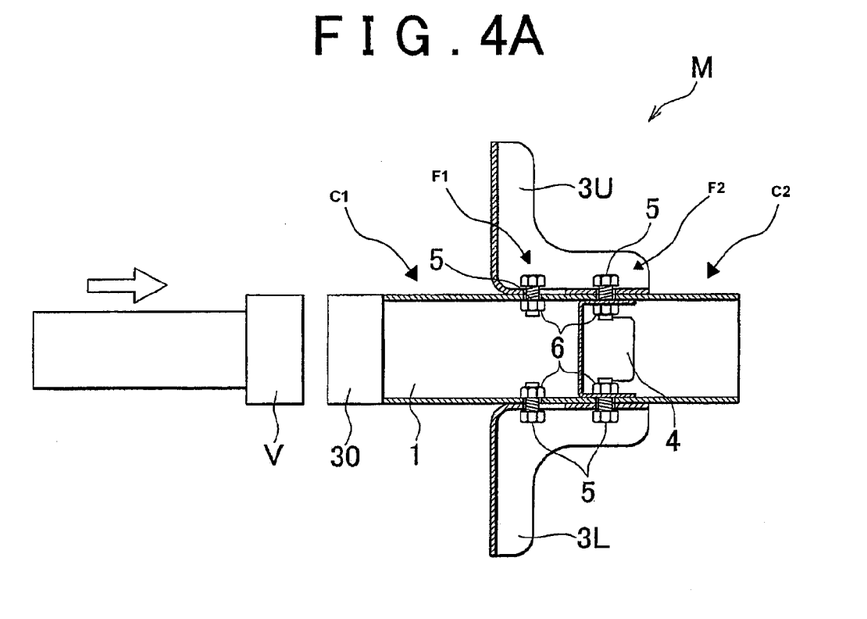
FIG. 4A is a view showing a frame format as viewed from the side of another vehicle colliding with a bumper reinforcement.
Figure 4B:
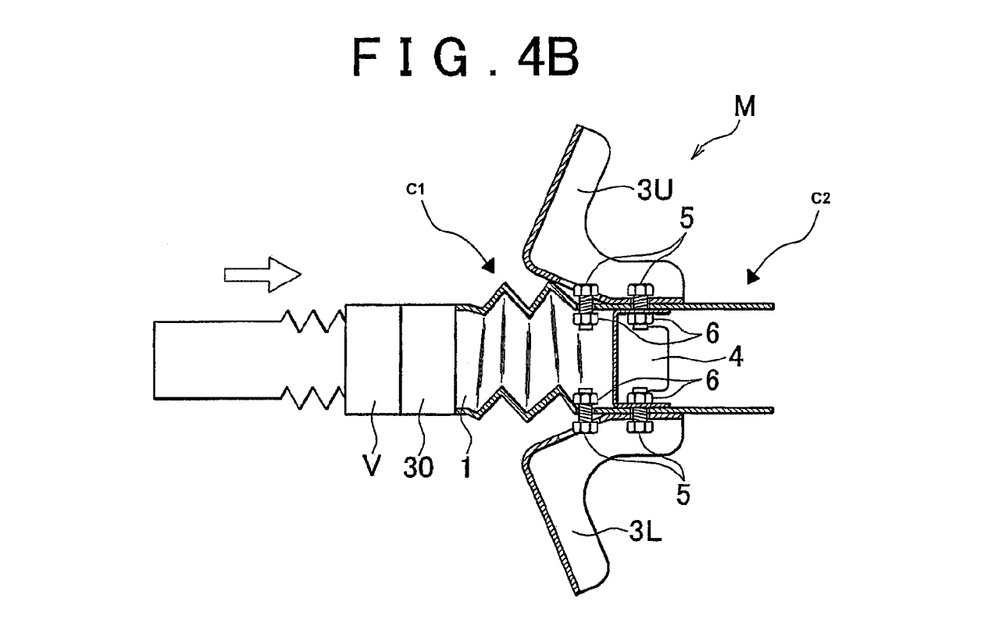
FIG. 4B is a view showing a frame format as viewed from the side of the side member deformed as a result of the collision.

Here, as shown in FIG. 4A, when another vehicle V collides with the bumper reinforcement 30 of the vehicle M, the force of impact from the collision is transmitted directly to the side member 1 (1R and 1L). This force of impact causes the side member 1 (at a first crumple zone C1) to buckle and deform, which absorbs the force of the impact, as shown in FIG. 4B. At this time, the bracket 3 is fixed to the side member 1 by the front and rear bolts 5. The front bolt 5 is fixed to the side member 1 through the fastening hole 11 and the rear bolt 5 which is fixed to the side member 1 through the fixing/fastening hole 14. It may also be said that the rear bolt 5 is provided closer to the center, in the longitudinal direction, of the vehicle than the front bolt 5. In this example, the front-most bolt 5, which extends through hole 11 of bracket 3, and the front-most nut 6 constitute a first fastening portion F1. Similarly, the rear-most bolt 5, which extends through hole 14 of bracket 3, and the rear-most nut 6 constitute a second fastening portion F2.

As the side member 1 buckles and deforms, the front bolt 5 moves toward the rear. The bracket 3 which is attached to the side member 1 does not move at this time so when the front bolt 5 moves toward the rear, it does so relative to the bracket 3. As a result of this rearward movement, the front bolt 5 slips out of the fastening hole 11 formed in the bracket 3 and moves rearward along the guide hole 13 until it reaches the release hole 12. That is, first fastening portion F1 separates from the side member.

When the front bolt 5 reaches the release hole 12, the head portion of the front bolt 5 slips through the release hole 12 so the bracket 3 is no longer restricted by the front bolt 5. As a result, the bracket 3 and the radiator support 2 (2U and 2L) separate from the side member 1. Having the radiator support 2 separate from the side member 1 prevents it from causing a dead stroke in the buckling deformation of the side member 1. Accordingly, the side member 1 is able to buckle and deform efficiently, thus better absorbing the force of impact from the collision.

Also, it can also be said that the rear bolt 5 fastens the radiator support 2 to the side member 1 with less clamping force than the front bolt 5.

Figure 5A:
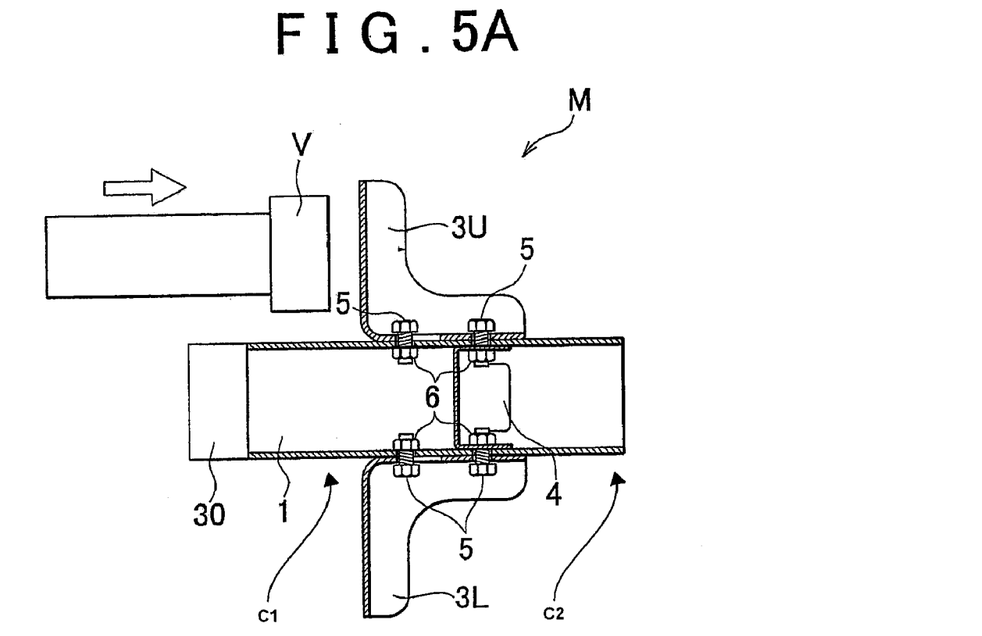
FIG. 5A is a view showing a frame format as viewed from the side of another vehicle colliding with an upper radiator support.

Further, as shown in FIG. 5A, when the other vehicle V collides with the upper radiator support 2U of the vehicle M, the force of impact acting on the upper radiator support 2U from the collision is transmitted to the side member 1 via the upper radiator support 2U and the bracket 3. At this time, the force of impact from the collision forces the upper radiator support 2U and the bracket 3 toward the rear with respect to the side member 1.

Figure 5B:
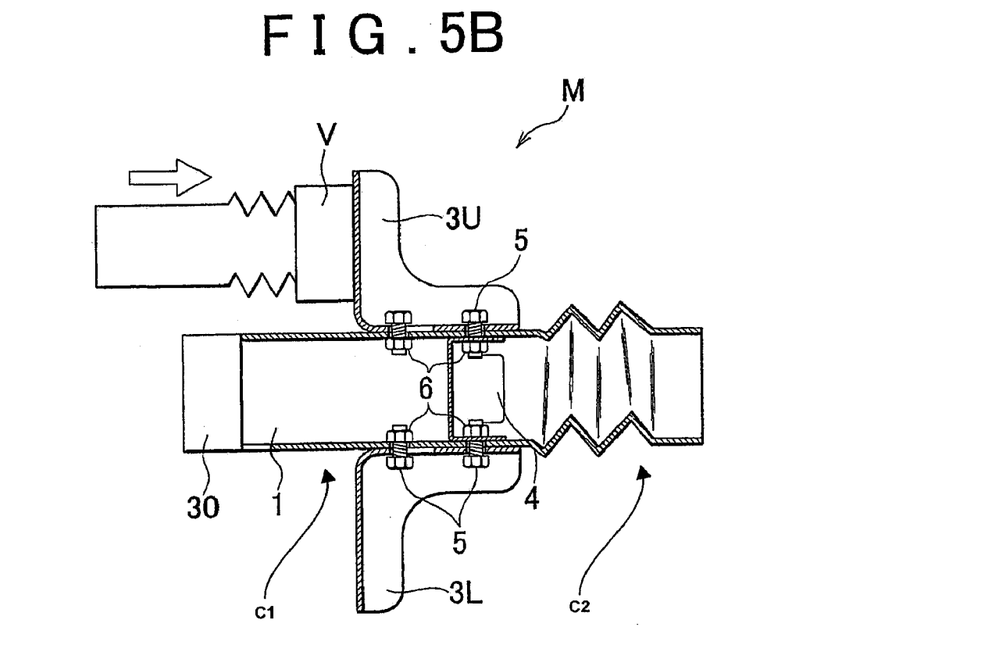
FIG. 5B is a view showing a frame format as viewed from the side of the side member deformed by buckling as a result of the collision.

However, both the front and rear bolts 5 are forced rearward by the bracket 3. Accordingly, force is applied that moves the joining portion where the bracket 3 is joined to the side member 1, together with the bracket 3, as shown in FIG. 5B. As a result, the upper radiator support 2U and the bracket 3 do not separate from the side member 1. Instead, the upper radiator support 2U remains joined to the side member 1 by the bracket 3. As a result, the force of impact applied to the upper radiator support 2U is better transmitted to the side member 1, and the side member 1 deforms (at a second crumple zone C2) by buckling at a position behind the joining portion where the bracket 3 is joined to the side member 1. This buckling deformation of the side member 1 enables the force of impact from the collision to be better absorbed.

Figure 6A:
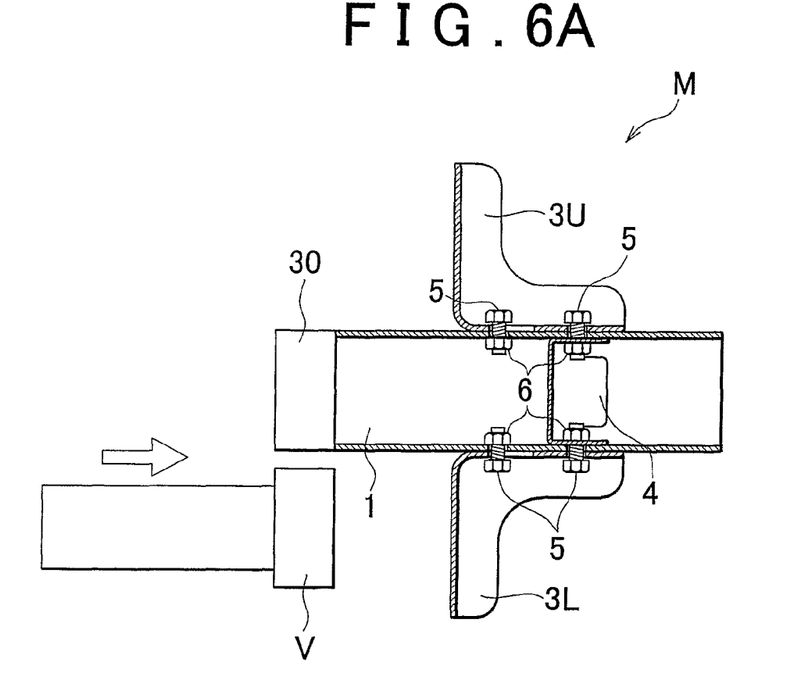
FIG. 6A is a view showing a frame format as viewed from the side of another vehicle colliding with a lower radiator support.
Figure 6B:
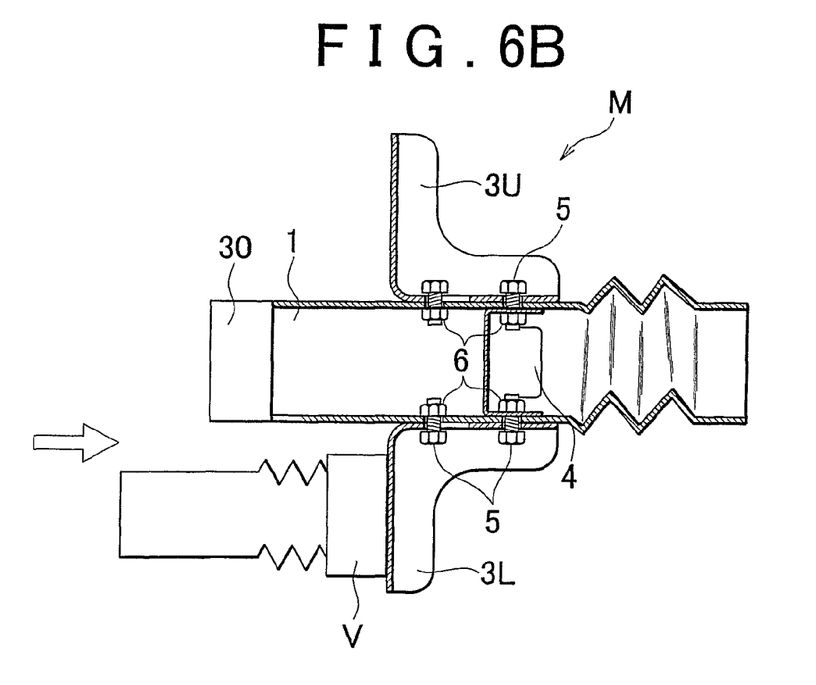
FIG. 6B is a view showing a frame format as viewed from the side of the side member deformed by buckling as a result of the collision.

Also, at the lower radiator support 2L as well, as shown in FIGS. 6A and 6B, impact force applied to the lower radiator support 2L by the same action as in the case of the upper radiator support 2U is better transmitted to the side member 1, and the side member 1 (at the second crumple zone C2) deforms by buckling at a position behind the joining portion where the bracket 3 is joined to the side member 1. That is, external force is transmitted to second crumple zone C2 via second fastening portion F2. This buckling deformation of the side member 1 enables the force of impact from the collision to be better absorbed.

Accordingly, even if another vehicle collides with the side member 1 or the radiator support 2 that is fixed to the side member 1, the force of impact that is applied can be effectively transmitted to the crumple zone of the side member. As a result, the ability to absorb the impact from a frontal collision of the vehicle M can be improved.

Next, a second example embodiment of the invention will be described. The vehicle front portion structure according to this second example embodiment differs from that of the foregoing first example embodiment mainly with respect to the shape of the bracket. The other structure of the second example embodiment is the same as that of the first example embodiment described above.

Figure 7:
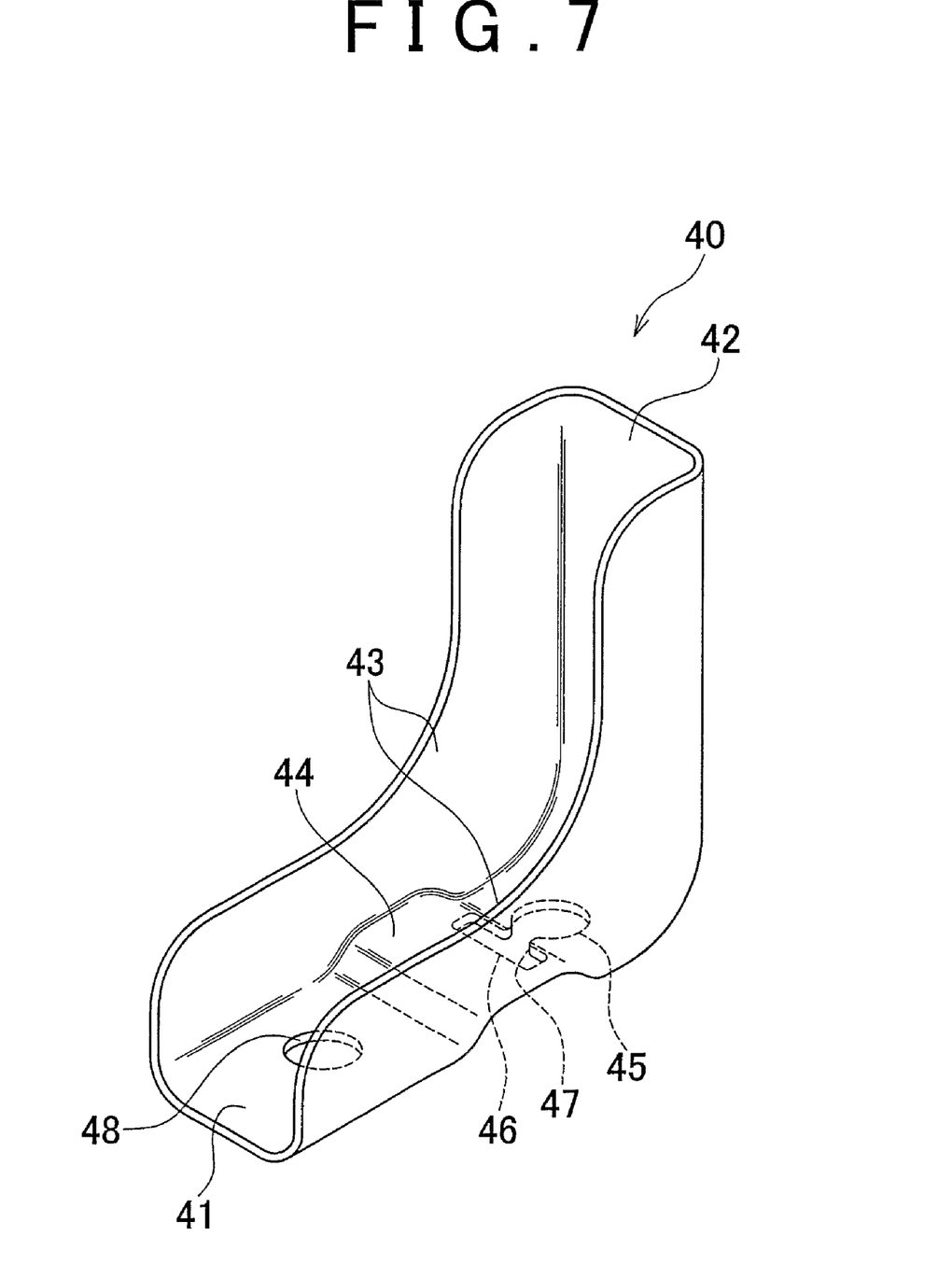
FIG. 7 is a perspective view of a bracket of a front portion structure of a vehicle according to a second example embodiment of the invention.

The vehicle front portion structure according to this second example embodiment uses a bracket 40 shown in FIG. 7. As shown in FIG. 7, the bracket 40 has a flat plate 41, a rising plate 42, and a side plate 43 which is provided on the side of the flat plate 41 and the rising plate 42, similar to the bracket 3 in the foregoing first example embodiment. Also, a convex portion 44 is formed on the flat plate 41. The portion having the convex portion 44 is formed on the flat plate 41 so that it rises in the direction in which the rising plate 42 rises.

Also, a fastening hole 45 is formed in the flat plate 41 between the rising plate 42 and the convex portion 44, and a release hole 46 is formed in the surface of the convex portion 44 on the side closer to the rising plate 42. The fastening hole 45 and the release hole 46 are connected by a guide hole 47. Further, a fixing/fastening hole 48 is formed in the flat plate 41 on the opposite side of the convex portion 44 from the rising plate 42.

Figure 8A:
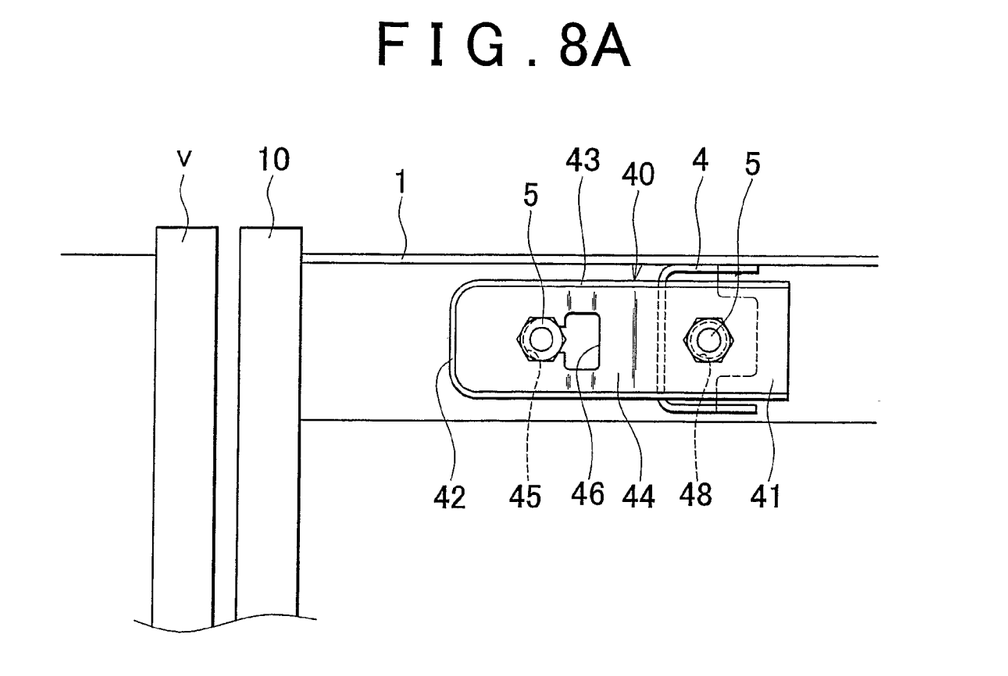
FIG. 8A is a view showing a frame format as viewed from above of the front portion structure of a vehicle according to the second example embodiment before another vehicle collides with a bumper reinforcement.
Figure 8B:
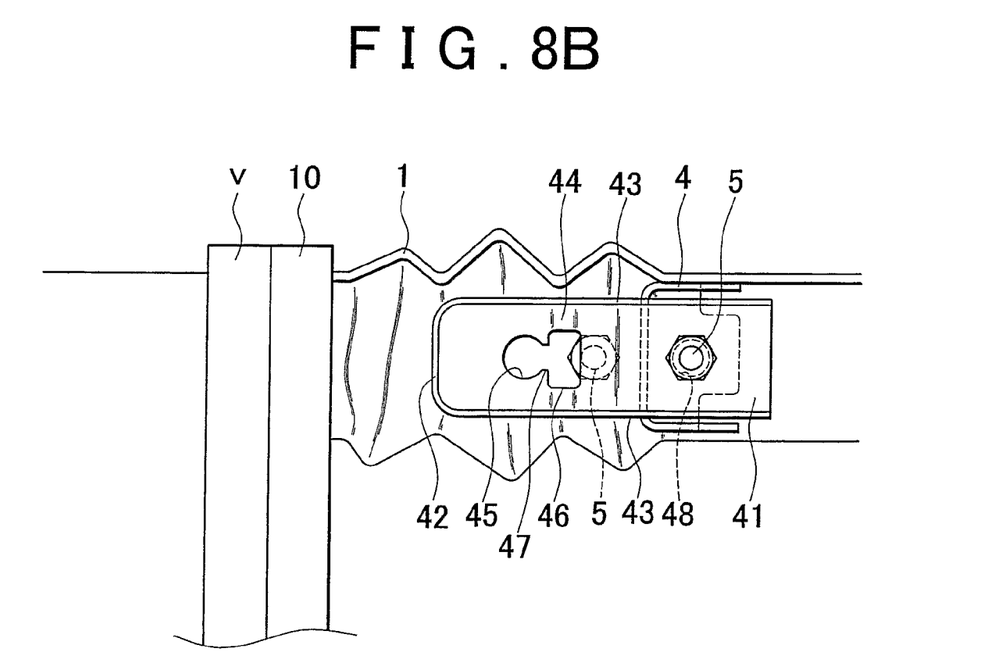
FIG. 8B is a view showing a frame format as viewed from above of the side member deformed by buckling as a result of the other vehicle colliding with the bumper reinforcement.

In the vehicle front portion structure of according to this example embodiment having the foregoing structure, the force of impact from a frontal collision of the vehicle M is softened by being absorbed by the crumple zones of the side members 1R and 1L buckling and deforming, just as in the foregoing first example embodiment. For example, as shown in FIG. 8A, when another vehicle collides with the bumper reinforcement 30, the force of impact from the collision is transmitted directly to the side member 1. This force of impact causes the side member 1 to buckle and deform which absorbs the force of the impact, as shown in FIG. 8B. At this time, the bracket 40 is fixed to the side member 1 by front and rear bolts 5. The front bolt 5 is fixed to the side member 1 through the fastening hole 45, and the rear bolt 5 is fixed to the side member 1 through the fixing/fastening hole 48.

As the side member 1 buckles and deforms, the front bolt 5 moves toward the rear. The bracket 40 which is mounted to the side member 1 does not move at this time so when the front bolt 5 moves toward the rear, it does so relative to the bracket 40. As a result of this rearward movement, the front bolt 5 slips out of the fastening hole 45 formed in the bracket 40 and moves rearward along the guide hole 47 until it reaches the release hole 46.

When the front bolt 5 reaches the release hole 46, the head portion of the front bolt 5 slips through the release hole 46 to the rear so the bracket 40 is no longer restricted by the front bolt 5. As a result, the bracket 40 and the radiator support 2 separate from the side member 1. Having the radiator support 2 separate from the side member 1 prevents it from causing a dead stroke in the buckling deformation of the side member 1. Accordingly, the side member 1 is able to buckle and deform efficiently, thus better absorbing the force of impact from the collision.

Also, when the other vehicle V collides with the upper radiator support 2U of the vehicle M, the radiator support 2 and the bracket 40 do not separate from the side member 1 so the force of impact is transmitted from the radiator support 2 to the side member 1 through the bracket 40. Accordingly, the side member 1 deforms by buckling at a position behind the joining portion where the bracket 40 is joined to the side member 1. This buckling deformation of the side member 1 enables the force of impact from the collision to be better absorbed.

Continuing on, a third example embodiment of the invention will now be described. This third example embodiment differs from the foregoing first example embodiment mainly with respect to the mounting structure by which the radiator is mounted to the side member. The other structure of the third example embodiment is the same as that of the first example embodiment described above.

Figure 9:
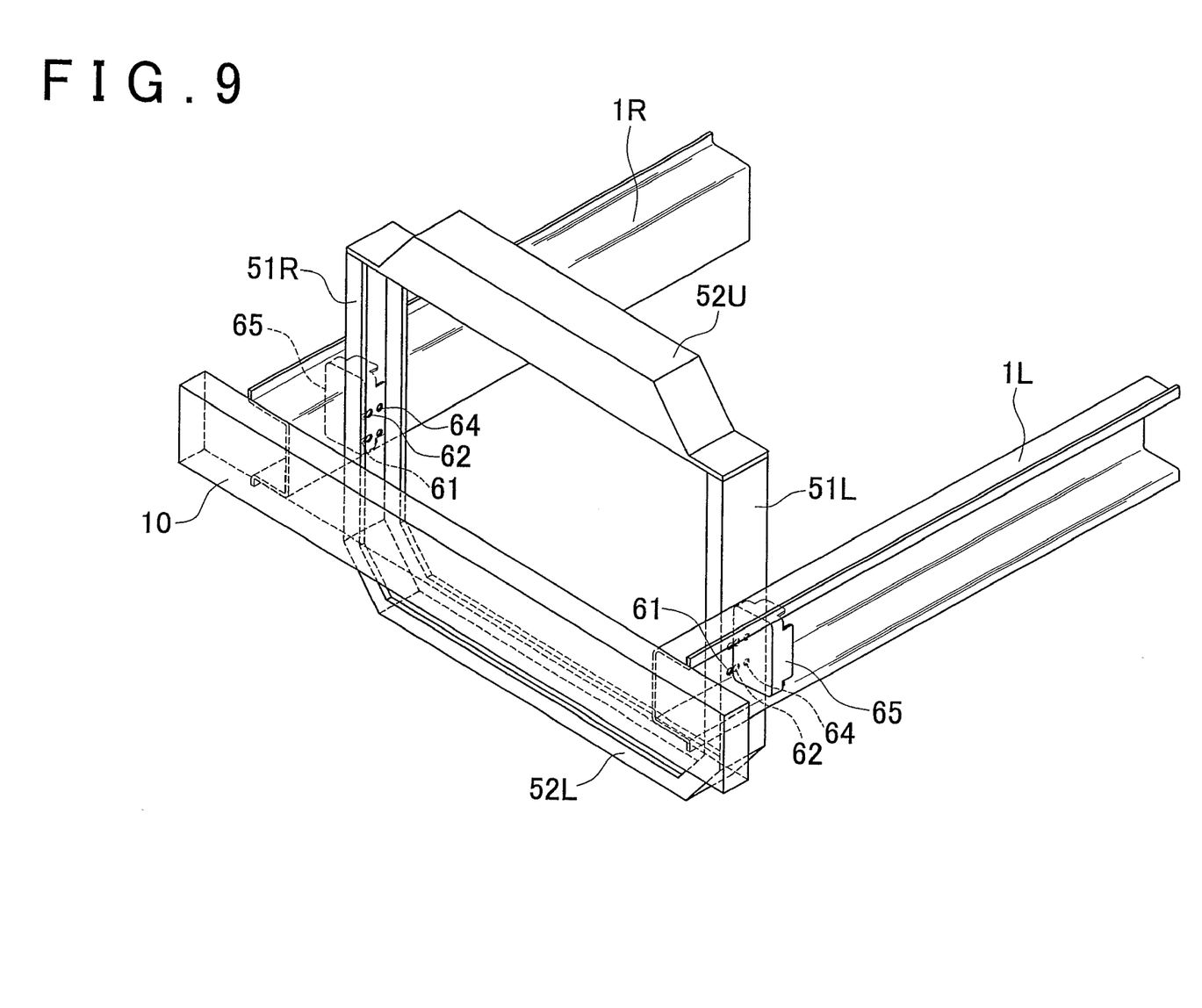
FIG. 9 is a perspective view of a front portion structure of a vehicle according to a third example embodiment of the invention.

As shown in FIG. 9, with the vehicle front portion structure according to this example embodiment, a right radiator support 51R and a left radiator support 51L are mounted to the vehicle inside surfaces of the side members 1R and 1L, respectively. Also, the upper end portions of the right and left radiator supports 51R and 51L are connected together by an upper radiator support 52U, and the lower end portions of the right and left radiator supports 51R and 51L are connected together by a lower radiator support 52L.

Figure 10:
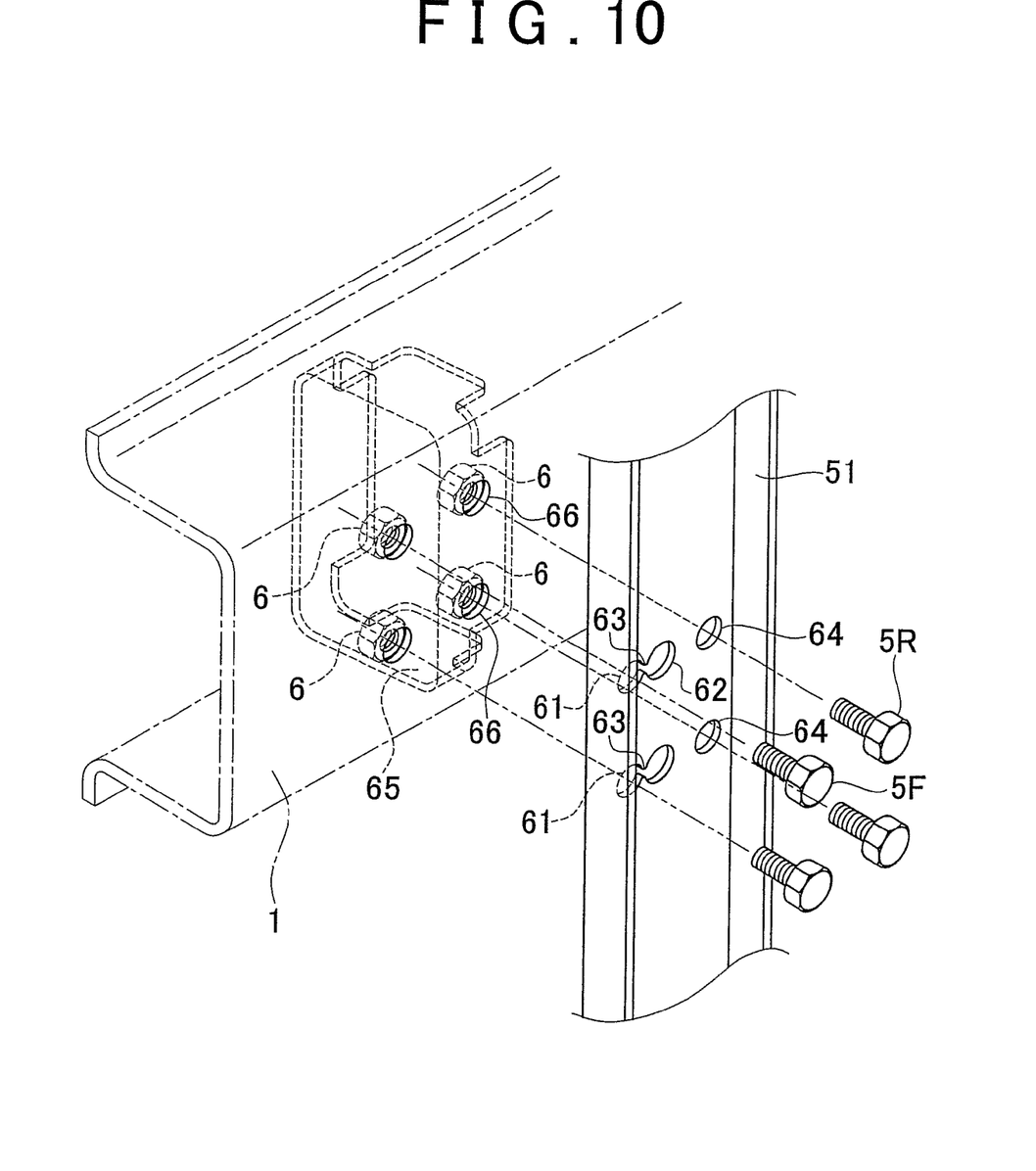
FIG. 10 is an enlarged exploded perspective view of a joining portion of a side member and a radiator support.

Also, as shown in FIG. 10, a fastening hole 61 and a release hole 62 are both formed in portions of the left and right radiator supports 51 (i.e., 51R and 51L) where the side members 1 (i.e., 1R and 1L) attach. The fastening hole 61 is arranged so that the fastening hole 61 is closer to the front of the vehicle than the release hole 62 is. The fastening hole 61 and the release hole 62 are connected by a guide hole 63.

A fixing/fastening hole 64 is formed to the rear of the release hole 62. A front bolt 5F is fitted through the fastening hole 61 and a rear bolt 5R is fitted through the fixing/fastening hole 64. The radiator supports 51 are mounted to the side members 1 by fixing the bolts 5F and 5R to the side members 1 by screwing nuts 6 onto the bolts 5F and 5R. Here, the fastening holes 61 and fixing/fastening holes 64 have a smaller diameter than the head portions of the bolts 5F and 5R, and the release holes 62 have a larger diameter than the head portions of the bolts 5F and 5R. Moreover, the width of the guide hole 63 is greater than the diameter of the threaded portions of the bolts 5F and 5R but smaller than the diameter of the head portions.

Also, a bulkhead 65 is provided in a position on the side member 1 where the bolt hole through which the bolt that fits through the fixing/fastening hole 64 in the radiator support 51 also fits is provided. Bolt holes 66 through which the bolts 5F, 5R fit are formed in the side portion of the bulkhead 65. As in the first embodiment of the invention, a difference is caused in strength between a fasten portion of the side member 1, to which the bulkhead 65 is fastened, and a release portion of the side member 1, to which the bulkhead 65 is not fastened. Therefore, deformation of the release portion is promoted. As a result, the front bolt 5F slips out of the release hole 62 more easily, when a vehicle collision occurs.

With the vehicle front portion structure according to this example embodiment having the foregoing structure, when the vehicle M is impacted from the front, such as in a frontal collision, the force of impact from the collision can be softened by absorbing it by having the crumple zones of the side members 1R and 1L deform by buckling. Here, when the other vehicle V collides with the bumper reinforcement 10, the force of impact from the collision is transmitted directly to the side member 1. The force of impact causes the side member 1 to buckle and deform, thus absorbing the force of the impact. As the side member 1 buckles and deforms, the front bolt 5F moves to the rear. The radiator support 51 does not move at this time so the front bolt 5F slips out of the fastening hole 61 formed in the radiator support 51 and moves rearward along the guide hole 63 until it reaches the release hole 62.

Then the head portion of the front bolt 5F slips through the release hole 62 to the rear so the radiator support 51 is no longer restricted by the front bolt 5F. As a result, the radiator support 51 separates from the side member 1. Having the radiator support 51 separate from the side member 1 prevents it from causing a dead stroke in the buckling deformation of the side member 1. Accordingly, the side member 1 is able to buckle and deform efficiently, thus better absorbing the force of impact from the collision.

Also, when another vehicle collides with the radiator support 51 or the upper radiator support 52U of the vehicle M, the radiator support 51 does not separate from the side member 1 so the force of impact is transmitted from the radiator support 51 to the side member 1 just as in the foregoing first example embodiment. Accordingly, the side member 1 deforms by buckling at a position behind the joining portion where the radiator support 51 is joined to the side member 1. This buckling deformation of the side member 1 enables the force of impact from the collision to be better absorbed.

Continuing on, a fourth example embodiment of the invention will now be described. This fourth example embodiment differs from the foregoing third example embodiment mainly with respect to the structure of the joining portion where the radiator support is joined to the side member. The other structure of the fourth example embodiment is the same as that of the third example embodiment described above.

Figure 11:
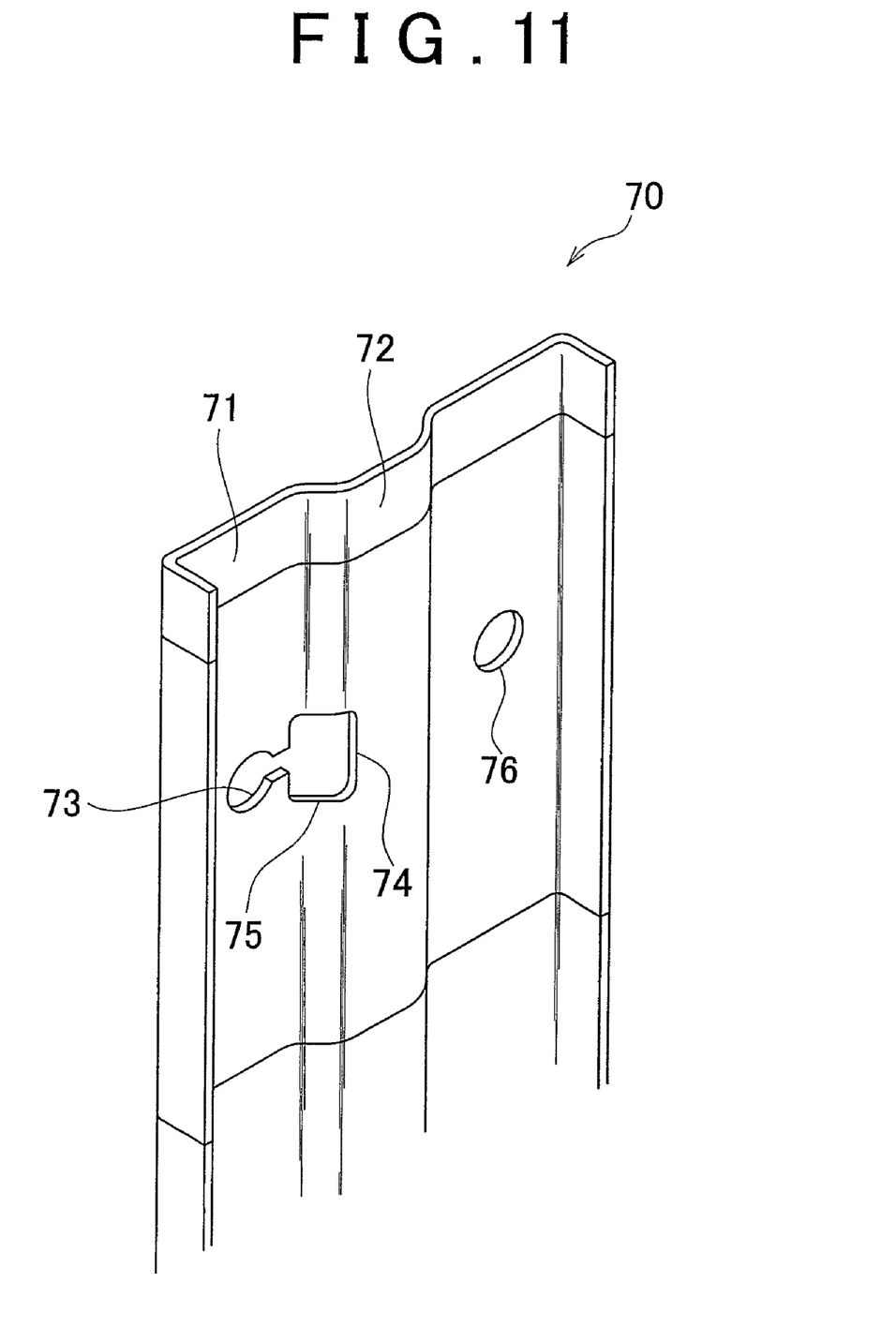
FIG. 11 is a perspective view of a bracket of a front portion structure of a vehicle according to a fourth example embodiment of the invention.

As shown in FIG. 11, a radiator support 70 in a vehicle front portion structure according to this example embodiment is provided with a flat plate 71 that extends vertically. A convex portion 72 that protrudes from the flat plate 71 toward the inside of the vehicle is formed in the center portion in the longitudinal direction of the flat plate 71. A fastening hole 73 is formed in the flat plate 71 in a position closer to the front than the convex portion 72, and a release hole 74 is formed in the surface of the convex portion 72 that is toward the front.

The fastening hole 73 and the release hole 74 are connected together by a guide hole 75. Further, a fixing/fastening hole 76 is formed behind the convex portion 72.

With the vehicle front portion structure according to this example embodiment having the foregoing structure, when the vehicle M is involved in a frontal collision, the force of impact from the collision can be softened by absorbing it by having the crumple zones of the side members deform by buckling, just as in the third example embodiment. Here, when the other vehicle collides with the bumper reinforcement 10, the bolt that is held in the fastening hole 73 by the head portion moves rearward along the guide hole 75 and slips out of the release hole 74. This enables the radiator support 70 to separate from the side member which prevents it from causing a dead stroke in the buckling deformation of the side member. Accordingly, the side member 1 is able to buckle and deform efficiently, thus better absorbing the force of impact from the collision.

Also, when another vehicle collides with the radiator support or the upper radiator support of the vehicle, the radiator support 70 does not separate from the side member so the force of impact is transmitted from the radiator support 70 to the side member. Accordingly, the side member deforms by buckling at a position behind the joining portion where the radiator support 70 is joined to the side member. This buckling deformation of the side member enables the force of impact from the collision to be better absorbed.

Figure 12:
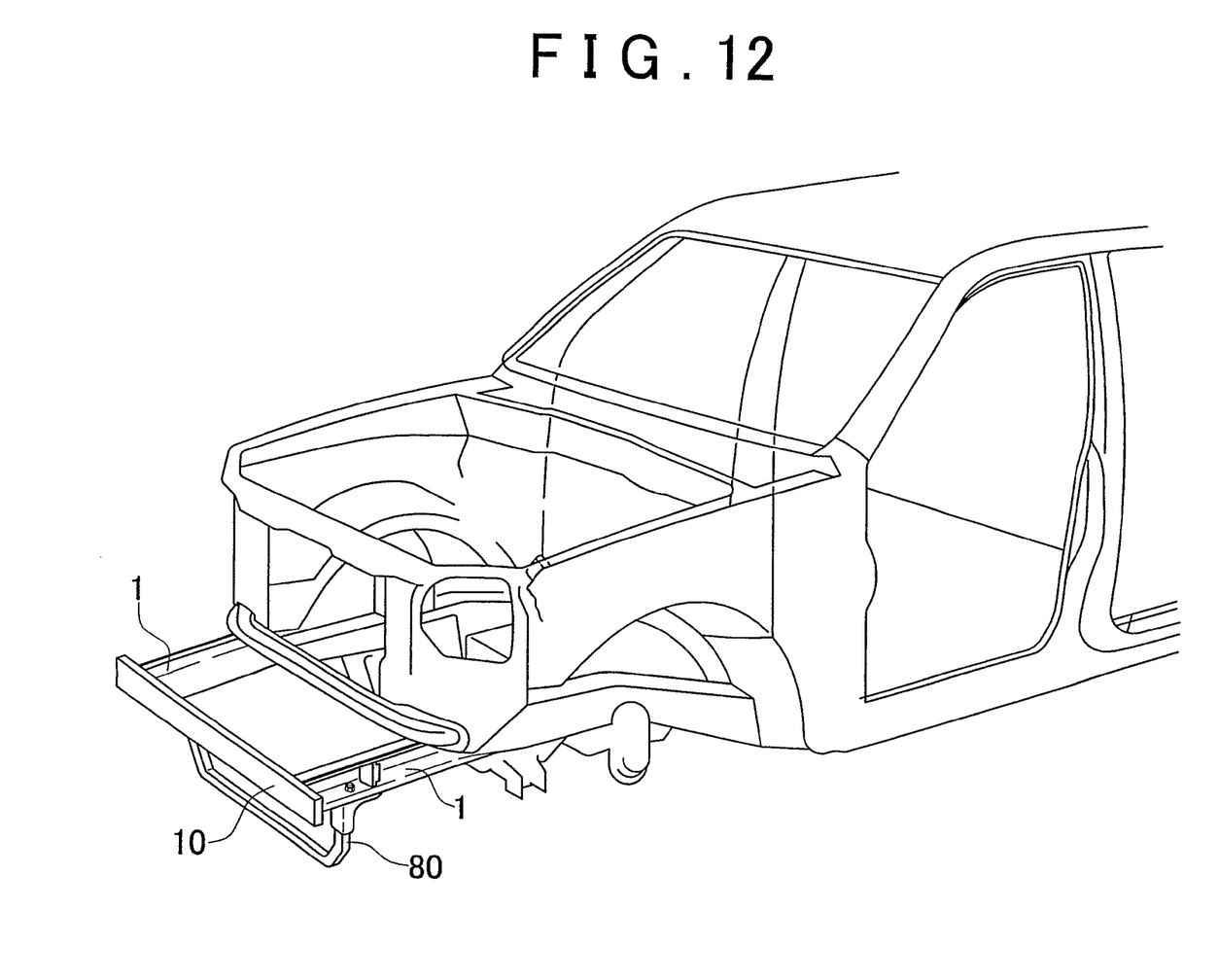
FIG. 12 is a perspective view of the frame structure of a vehicle provided with an under protector.

While example embodiments of the invention have been illustrated above, it is to be understood that the invention is not limited to details of the illustrated embodiments. For example, in the foregoing example embodiments, the sub-frame is the radiator support. However, the sub-frame may also be an under protector 80 that is provided on the front portion of the vehicle, as shown in FIG. 12, for example. Also, in the foregoing example embodiments, the fastening holes and release holes and the like are formed in the bracket or the radiator support, but they may also be formed in the side member, for example. Also, individual holes may also be formed in the bracket and the side member and the like.

Furthermore, the method of connecting the side member with the sub-frame or bracket is not limited to a bolt. That is, the side member and the sub-frame or bracket may also be connected by welding or using a connecting member other than a bolt, for example. When using a connecting member, a fastening hole and release hole may be formed in the connecting member, or alternatively, a separating structure may be provided. When the side member and the sub-frame or bracket are connected by welding, the side member and the frame need only be welded to each other at two spots in the longitudinal direction of the vehicle, with the strength of the front weld intentionally being made weaker than the strength of the rear weld. Also, the foregoing example embodiments only describe a vehicle front portion structure. However, when using a sub-frame that connects a pair of side members of a vehicle rear portion, a similar structure may also be used with this sub-frame. That is, the invention also may be applied to a vehicle rear portion structure.

The invention claimed is:

1. A vehicle end portion structure, comprising:
   a side member which extends in a longitudinal direction of the vehicle and has, at one end portion, a crumple zone that includes a first crumple zone and a second crumple zone that is provided closer to a center of the vehicle in the longitudinal direction than the first crumple zone; and
   a sub-frame which is attached to the first crumple zone so as to protrude vertically from the side member,
   wherein the sub-frame includes a first fastening portion that is fastened to the side member at the first crumple zone, and a second fastening portion that is fastened to the side member at a portion other than the first crumple zone; the first fastening portion separates from the side member by the first crumple zone deforming when external force is applied to the side member; and the second crumple zone deforms when external force applied to the sub-frame is transmitted to the second crumple zone via the second fastening portion.

2. The vehicle end portion structure according to claim 1, further comprising:
   a fastening bolt that attaches the sub-frame to the side member,
   wherein a joining portion where a fastening hole having a smaller diameter than a head portion of the fastening bolt, a release hole having a larger diameter than the head portion of the fastening bolt, and a guide hole that connects the fastening hole with the release hole, are formed, is arranged in one of the sub-frame and the side member, and the fastening bolt moves along the guide hole when external force from the longitudinal direction is applied to one of the side member and the sub-frame.

3. The vehicle end portion structure according to claim 2, further comprising:
   a transmitting member which transmits external force applied to the sub-frame to the side member and is provided in a position where the sub-frame is attached to the side member.

4. The vehicle end portion structure according to claim 1, wherein the sub-frame is a radiator support.

5. The vehicle end portion structure according to claim 1, wherein the sub-frame is an under protector.

* * * * *